(12) United States Patent
Vanevenhoven et al.

(10) Patent No.: US 11,383,855 B2
(45) Date of Patent: Jul. 12, 2022

(54) DC BUS VOLTAGE INPUT INTO RAT AUTO-DEPLOY

(71) Applicant: Hamilton Sundstrand Corporation, Charlotte, NC (US)

(72) Inventors: Jordan K. Vanevenhoven, Rockford, IL (US); Jeffrey D. Myroth, Roscoe, IL (US); Shane R. Traser, Rockford, IL (US); Jef William Good, German Valley, IL (US); John N. Buzzard, Rockford, IL (US); Kyle Stephen Ives, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 330 days.

(21) Appl. No.: 16/822,593

(22) Filed: Mar. 18, 2020

(65) Prior Publication Data

US 2021/0292000 A1     Sep. 23, 2021

(51) Int. Cl.
*B64D 41/00*     (2006.01)
*H02J 4/00*     (2006.01)
*H02J 3/38*     (2006.01)

(52) U.S. Cl.
CPC ............ *B64D 41/007* (2013.01); *H02J 3/381* (2013.01); *H02J 4/00* (2013.01); *F05D 2270/09* (2013.01)

(58) Field of Classification Search
CPC . B64D 41/007; H02J 3/381; H02J 4/00; H02J 1/10; H02J 3/38; H02J 3/48; F05D 2270/09
See application file for complete search history.

(56) References Cited

U.S. PATENT DOCUMENTS

| | | |
|---|---|---|
| 5,899,411 A | 5/1999 | Latos et al. |
| 8,820,677 B2 | 9/2014 | Rajashekara et al. |
| 9,083,201 B2 | 7/2015 | Bauer et al. |
| 9,789,973 B2 | 10/2017 | Swearingen et al. |
| 10,029,631 B2 | 7/2018 | Iwashima et al. |
| 2012/0013177 A1 | 1/2012 | Krenz et al. |
| 2013/0062943 A1* | 3/2013 | Bauer ..................... H02J 9/066 307/23 |
| 2013/0214589 A1* | 8/2013 | Swearingen ......... B64D 41/007 307/9.1 |

OTHER PUBLICATIONS

Extended European Search Report dated Jul. 30, 2021, issued during the prosecution of European Patent Application No. EP 21163521.4.

* cited by examiner

*Primary Examiner* — Toan T Vu
(74) *Attorney, Agent, or Firm* — Locke Lord LLP; Joshua L. Jones; Scott D. Wofsy

(57) ABSTRACT

A system includes a first AC bus configured to supply power from a first AC power source. A second AC bus is configured to supply power from a second AC power source. A first transformer rectifier unit (TRU) connects a first DC bus to the first AC bus through a first TRU contactor (TRUC). A second TRU connects a second DC bus to the second AC bus through a second TRUC. A first voltage sensor is connected to sense voltage of the first DC bus. A second voltage sensor is connected to sense voltage of the second DC bus. A ram air turbine (RAT) automatic deployment controller is operatively connected to the first voltage sensor and to the second voltage sensor to automatically deploy a RAT based on the combined status of the first voltage sensor and the second voltage sensor.

15 Claims, 2 Drawing Sheets

DC BUS VOLTAGE INPUT INTO RAT AUTO-DEPLOY

BACKGROUND

1. Field

The present disclosure relates to power distribution systems, and more particularly to AC essential busses such as used in aerospace applications.

2. Description of Related Art

Traditionally, ram air turbine (RAT) automatic deployment (auto-deploy) has been performed based on generator line contactor status. This does not take into consideration system configurations when an AC power source is available to provide power to the AC buses but is not available to power the DC buses, or for scenarios where contactor statuses cannot be relied upon. This can ultimately rely on airmanship to recognize the condition and manually deploy the RAT.

The conventional techniques have been considered satisfactory for their intended purpose. However, there is an ever present need for improved systems and methods for power distribution. This disclosure provides a solution for this need.

SUMMARY

A system includes a first AC bus configured to supply power from a first AC power source. A second AC bus is configured to supply power from a second AC power source. A first transformer rectifier unit (TRU) connects a first DC bus to the first AC bus through a first TRU contactor (TRUC). A second TRU connects a second DC bus to the second AC bus through a second TRUC. A first voltage sensor is connected to sense voltage of the first DC bus. A second voltage sensor is connected to sense voltage of the second DC bus. A ram air turbine (RAT) automatic deployment controller is operatively connected to the first voltage sensor and to the second voltage sensor to automatically deploy a RAT based on the combined status of the first voltage sensor and the second voltage sensor.

An AC essential bus tie contactor (AETC) can selectively connect between an AC essential bus and the first and second AC busses. An AETC controller can be connected to switch the AETC between a first state connecting the AC essential bus to the first AC bus and a second state connecting the AC essential bus to the second AC bus. A first DC essential bus can be connected to the first DC bus through a first essential contactor (EC). A second DC essential bus can be connected to the second DC bus through a second EC. A third voltage sensor can be connected to sense voltage in the first DC essential bus. A fourth voltage sensor can be connected to sense voltage in the second DC essential bus. An essential TRU can be connected to a third DC essential bus through an essential TRUC. A fifth voltage sensor can be connected to sense voltage in the third DC essential bus. The RAT automatic deployment controller can be operatively connected to the fifth voltage sensor to automatically deploy the RAT based on the combined status of the first voltage sensor, the second voltage sensor, the third voltage sensor, the fourth voltage sensor, and the fifth voltage sensor.

A first essential tie contactor (ETC) can selectively connect between the first DC essential bus and the third DC essential bus. A second ETC can selectively connect between the third DC essential bus and the second DC essential bus. The first voltage sensor, second voltage sensor, third voltage sensor, fourth voltage sensor, and fifth voltage sensor can be operatively connected to the RAT automatic deployment controller. The RAT automatic deployment controller can be configured to deploy the RAT only if the following conditions are all met: voltage in the first DC bus is below a first selected threshold; voltage in the second DC bus is below a second selected threshold; and an aircraft onboard which the RAT is located is in air mode; or if status of one or more contactors indicates for RAT deployment. A ram air turbine (RAT) line contactor can connect between the AETC and the AC essential bus to selectively connect a RAT to the AC essential bus.

A system includes a first AC bus configured to supply power from a first AC power source. A second AC bus can be configured to supply power from a second AC power source. A first transformer rectifier unit (TRU) can connect a first essential DC bus to the first AC bus. A second TRU can connect a second essential DC bus to the second AC bus. A ram air turbine (RAT) automatic deployment controller can be operatively connected to the first contactor and to the second contactor to automatically deploy a RAT based on a combination of voltage status of the first essential DC bus and the second essential DC bus. The first essential DC bus can be downstream of the first transformer rectifier unit (TRU) connecting a first DC bus to the first AC bus through a first TRU contactor (TRUC) that connects between the first AC bus and the first DC bus. The second essential DC bus can be downstream of the second TRU connecting the second DC bus to the second AC bus through a second TRUC that connects between the second AC bus and the second DC bus.

A method of distributing power includes supplying power to at least one of a first DC bus and a second DC bus from at least one of a first AC bus, a second AC bus and/or an essential AC bus. The method includes automatically deploying a ram air turbine (RAT) if the voltage in the first and second DC buses drops below a selected threshold, even though at least one of the first AC bus, second AC bus, and essential AC bus is online.

Automatically deploying the RAT can include not having a human user deploy the RAT. Automatically deploying the RAT need only performed if the following logical condition is met:

an air mode is detected for an aircraft onboard which the RAT is located;
voltage in the first DC bus is below a first selected threshold; and
voltage in the second DC bus is below a second selected threshold; or
logic for a one or more contactors indicates for RAT deployment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
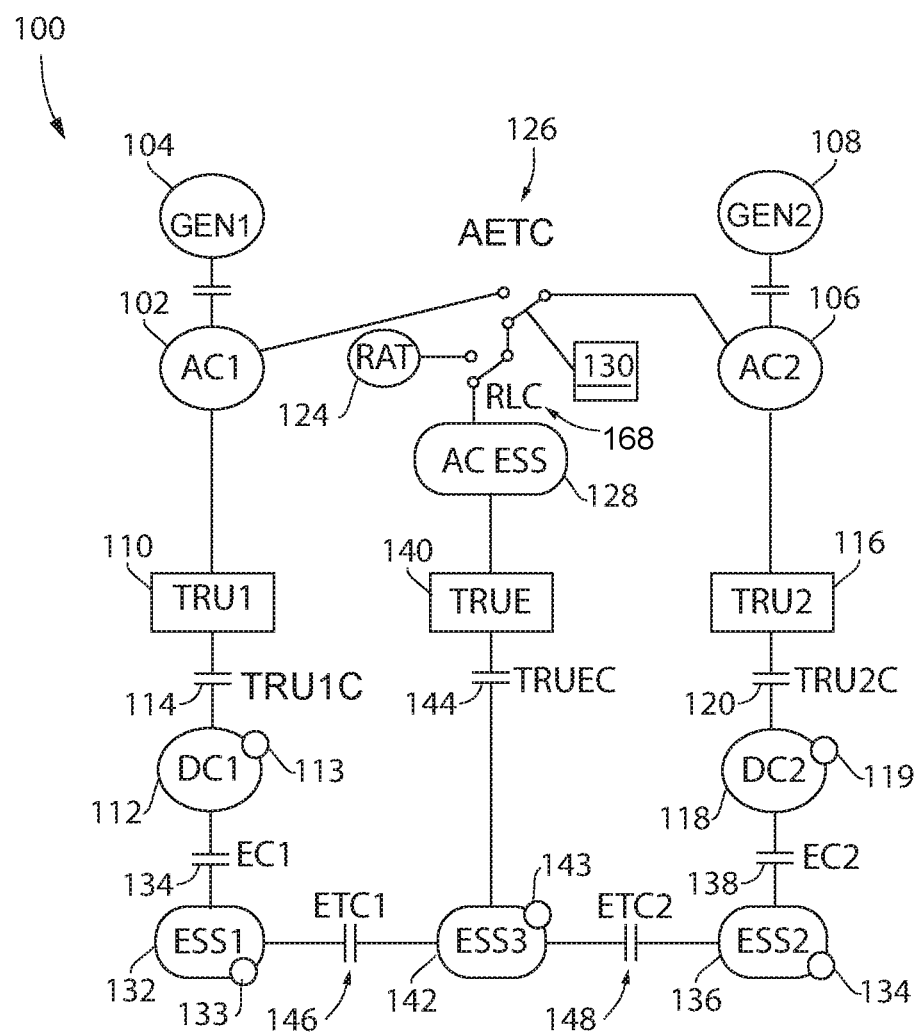
FIG. 1 is a schematic view of an embodiment of a system constructed in accordance with the present disclosure, showing the buses and contactors.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to deploy a RAT (ram air turbine) when an AC source may be online but unable to provide power to the DC system, which does not rely on contactor input statuses. This can prevent reliance on airmanship and flight crew action or loss of DC system loads and drain of batteries. A RAT can be used to convert ram air to electricity to provide aircraft electrical power in case normal sources of electric power are unavailable due to a component or system failure.

The system 100 includes a first AC bus 102 configured to supply power from a first AC power source, e.g. generator 104. A second AC bus 106 is configured to supply power from a second AC power source, e.g. generator 108. A first transformer rectifier unit (TRU) 110 connects a first DC bus 112 to the first AC bus 102 through a first TRU contactor (TRUC) 114. A second TRU 116 connects a second DC bus 118 to the second AC bus 106 through a second TRUC 120. A first voltage sensor 113 is connected to sense voltage of the first DC bus 112. A second voltage sensor 119 is connected to sense voltage of the second DC bus 118. A ram air turbine (RAT) automatic deployment controller 122 (shown in FIG. 2) is operatively connected to the first voltage sensor 113 and to the second voltage sensor 119 via input channels described below to automatically deploy a RAT 124 based on the combined status of the first voltage sensor 113 and the second voltage sensor 119.

An AC essential bus tie contactor (AETC) 126 can selectively connect between an AC essential bus 128 and the first and second AC busses 102, 106. An AETC controller 130 is connected to switch the AETC 126 between a first state connecting the AC essential bus 128 to the first AC bus 102 and a second state connecting the AC essential bus 128 to the second AC bus 106. A first DC essential bus 132 is connected to the first DC bus 112 through a first essential contactor (EC) 134. A second DC essential bus 136 is connected to the second DC bus 118 through a second EC 138. A third voltage sensor 133 can be connected to sense voltage in the first DC essential bus 132. A fourth voltage sensor 137 can be connected to sense voltage in the second DC essential bus 136. An essential TRU 140 can be connected to a third DC essential bus 142 through an essential TRUC 144. A fifth voltage sensor 143 can be connected to sense voltage in the third DC essential bus 142. The RAT automatic deployment controller 122 can be operatively connected to the fifth voltage sensor 143 to automatically deploy the RAT 124 based on a combination of the statuses of the first voltage sensor 113, the second voltage sensor 119, the third voltage sensor 133, the fourth voltage sensor 137, and/or the fifth voltage sensor 143. With continued reference to FIG. 1, a first essential tie contactor (ETC) 146 can selectively connect between the first DC essential bus 132 and the third DC essential bus 142. A second ETC 148 can selectively connect between the third DC essential bus 142 and the second DC essential bus 136.

Figure 2:
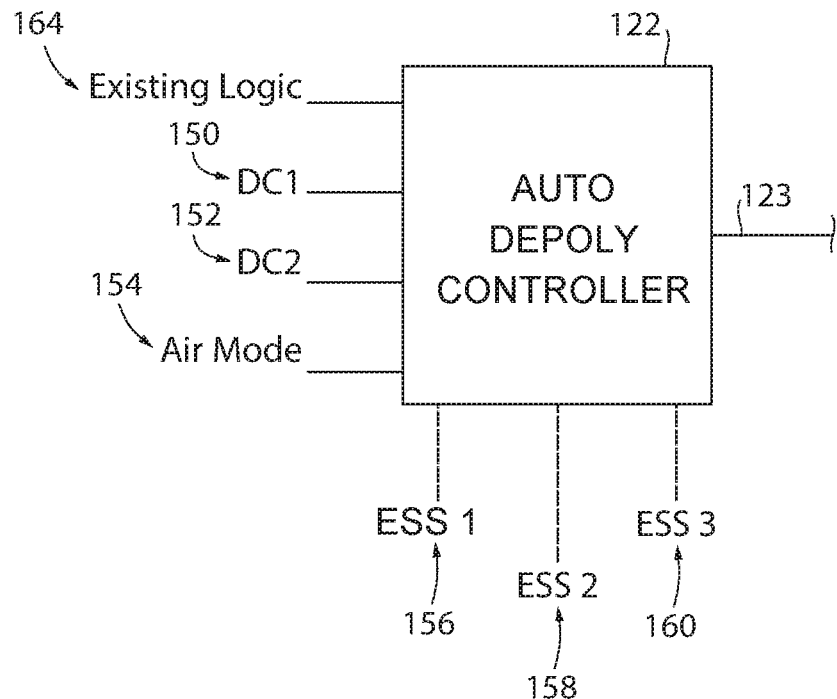
FIG. 2 is a schematic view of a portion of the system of FIG. 1, showing the controller inputs.

With reference now to FIG. 2, respective input channels 150, 152, 154, 156, 158, 160 connect the first voltage sensor 113, second voltage sensor 119, third voltage sensor 133, fourth voltage sensor 137, and fifth voltage sensor 143 individually to the RAT automatic deployment controller 122. A ram air turbine (RAT) line contactor 168 (shown in FIG. 1) connects between the AETC 126 and the AC essential bus 128 to selectively connect a RAT 124 to the AC essential bus 128. The controller 122 has an output 123 that drives the auto-deploy solenoid of the RAT 124.

Figure 3:
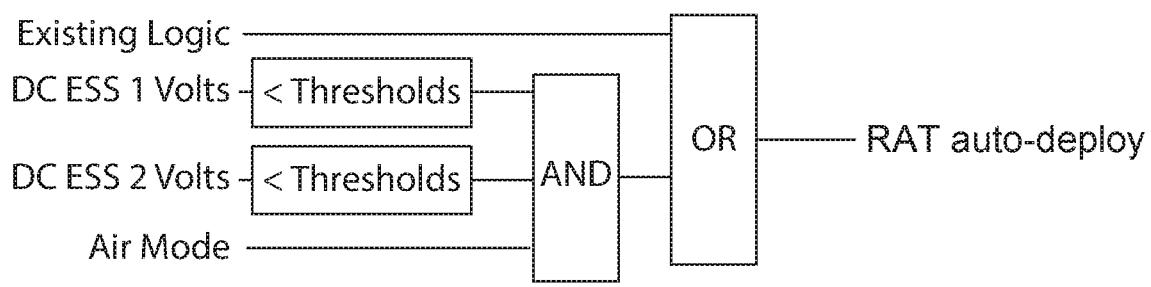
FIG. 3 is a schematic view of logic for controlling the system of FIG. 1.

With reference to FIG. 3, the RAT automatic deployment controller 122 of FIG. 2 can be configured to deploy the RAT 124, e.g., only if the following conditions are all met: voltage in the first DC essential bus 132 is below a first predetermined or selected threshold; voltage in the second DC essential bus 136 is below a second predetermined or selected threshold; and an aircraft onboard which the RAT is located is in air mode; or if additional logic, such as existing or traditional logic (on channel 164 of FIG. 2) indicative of status of one or more contactors indicates for RAT deployment. This control scheme could be used, e.g., as a reduced input scenario based on load criticality if channel 160 (for the third DC essential bus 142) is not available. Otherwise, input from the channel 160 can be used in addition to the input from channels 156, 158 to command for RAT deployment. It is also contemplated that the logic can include feedback from other input channels 150, 152, 160 of FIG. 2, indicative of voltages in DC buses 112, 118, 142 in addition to or in place of input channels 156, 158 for the first and second DC busses 132, 135.

A method of distributing power includes supplying power to at least one of a first DC bus (e.g. DC bus 112, 132, and/or 142) and a second DC bus (e.g. DC bus 118, 136, and/or 142) from at least one of a first AC bus 102, a second AC bus 106 and/or an essential AC bus 128. The method includes automatically deploying a RAT 124 if the voltage in the first and second DC buses drops below a predetermined or selected threshold, even though at least one of the first AC bus and second AC bus is online.

Automatically deploying the RAT 124 can include not having a human user deploy the RAT 124. Automatically deploying the RAT 124 need only performed, for example, if the following logical condition is met:
  an air mode is detected for an aircraft onboard which the RAT is located;
  voltage in the first DC essential bus is below a first predetermined or selected threshold; and
  voltage in the second DC essential bus is below a second predetermined or selected threshold; or
  logic for a one or more contactors indicates for RAT deployment.

The methods and systems of the present disclosure, as described above and shown in the drawings, provide for deployment of a RAT when an AC source may be online but unable to provide power to the DC system, which does not rely on contactor input statuses. This can prevent reliance on airmanship and flight crew action or loss of DC system loads and drain of batteries. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a first AC bus configured to supply power from a first AC power source;
   a second AC bus configured to supply power from a second AC power source;
   a first transformer rectifier unit (TRU) connecting a first DC bus to the first AC bus through a first TRU contactor (TRUC);
   a second TRU connecting a second DC bus to the second AC bus through a second TRUC;
   a first voltage sensor connected to sense voltage of the first DC bus;
   a second voltage sensor connected to sense voltage of the second DC bus; and
   a ram air turbine (RAT) automatic deployment controller operatively connected to the first voltage sensor and to the second voltage sensor to automatically deploy a RAT based on the combined status of the first voltage sensor and the second voltage sensor.

2. The system as recited in claim 1, wherein the first DC bus is a first DC essential bus, and wherein the second DC bus is a second DC essential bus.

3. The system as recited in claim 1, further comprising:
   first DC essential bus connected to the first DC bus through a first essential contactor (EC);
   a second DC essential bus connected to the second DC bus through a second EC;
   a third voltage sensor connected to sense voltage in the first DC essential bus; and
   a fourth voltage sensor connected to sense voltage in the second DC essential bus, wherein the RAT automatic deployment controller is operatively connected to the third voltage sensor and the fourth voltage sensor to automatically deploy the RAT based on statuses of the first voltage sensor, the second voltage sensor, the third voltage sensor, and the fourth voltage sensor.

4. The system as recited in claim 3, further comprising:
   an essential TRU connected to a third DC essential bus through an essential TRUC; and
   a fifth voltage sensor connected to sense voltage in the third DC essential bus, wherein the RAT automatic deployment controller is operatively connected to the fifth voltage sensor to automatically deploy the RAT based on the combined status of the first voltage sensor, the second voltage sensor, the third voltage sensor, the fourth voltage sensor, and the fifth voltage sensor.

5. The system as recited in claim 4, further comprising:
   a first essential tie contactor (ETC) selectively connecting between the first DC essential bus and the third DC essential bus; and
   a second ETC selectively connecting between the third DC essential bus and the second DC essential bus.

6. The system as recited in claim 4, wherein the first voltage sensor, second voltage sensor, third voltage sensor, fourth voltage sensor, and fifth voltage sensor are operatively connected to the RAT automatic deployment controller.

7. The system as recited in claim 6, wherein the RAT automatic deployment controller is configured to deploy the RAT if the following conditions are all met:
   voltage in the first DC bus is below a first selected threshold;
   voltage in the second DC bus is below a second selected threshold; and
   an aircraft onboard which the RAT is located is in air mode; or
   if status of one or more contactors indicates for RAT deployment.

8. The system as recited in claim 7, further comprising an AC essential bus tie contactor (AETC) selectively connecting between an AC essential bus and the first and second AC busses; and an AETC controller connected to switch the AETC between a first state connecting the AC essential bus to the first AC bus and a second state connecting the AC essential bus to the second AC bus.

9. The system as recited in claim 8, further comprising a ram air turbine (RAT) line contactor connecting between the AETC and the AC essential bus to selectively connect a RAT to the AC essential bus.

10. A system comprising:
    a first AC bus configured to supply power from a first AC power source;
    a second AC bus configured to supply power from a second AC power source;
    a first transformer rectifier unit (TRU) connecting between a first essential DC bus and the first AC bus;
    a second TRU connecting between a second essential DC bus and the second AC bus; and
    a ram air turbine (RAT) automatic deployment controller operatively connected to automatically deploy a RAT based on a combination of voltage status of the first essential DC bus and the second essential DC bus.

11. The system of claim 10, wherein the first essential DC bus is downstream of the first transformer rectifier unit (TRU), wherein the first TRU is between a first DC bus and the first AC bus, and wherein a first TRU contactor (TRUC) connects between the first AC bus and the first DC bus.

12. The system of claim 10, wherein the second essential DC bus is downstream of the second transformer rectifier unit (TRU), wherein the second TRU is between a second DC bus and the second AC bus, and wherein a second TRU contactor (TRUC) connects between the second AC bus and the second DC bus.

13. A method of distributing power comprising:
    supplying power to at least one of a first DC bus and a second DC bus from at least one of a first AC bus, a second AC bus and/or an essential AC bus; and
    automatically deploying a ram air turbine (RAT) if the voltage in the first and second DC buses drops below a selected threshold, even though at least one of the first AC bus, second AC bus, and essential AC bus is online.

14. The method as recited in claim 13, wherein automatically deploying the RAT includes not having a human user deploy the RAT.

15. The method as recited in claim 14, wherein automatically deploying the RAT is only performed if the following logical condition is met:
    an air mode is detected for an aircraft onboard which the RAT is located;
    voltage in the first DC bus is below a first selected threshold; and
    voltage in the second DC bus is below a second selected threshold; or
    logic for a one or more contactors indicates for RAT deployment.

* * * * *